June 2, 1942.  E. G. REID  2,284,988
MOTOR VEHICLE
Original Filed Feb. 24, 1937   5 Sheets-Sheet 1
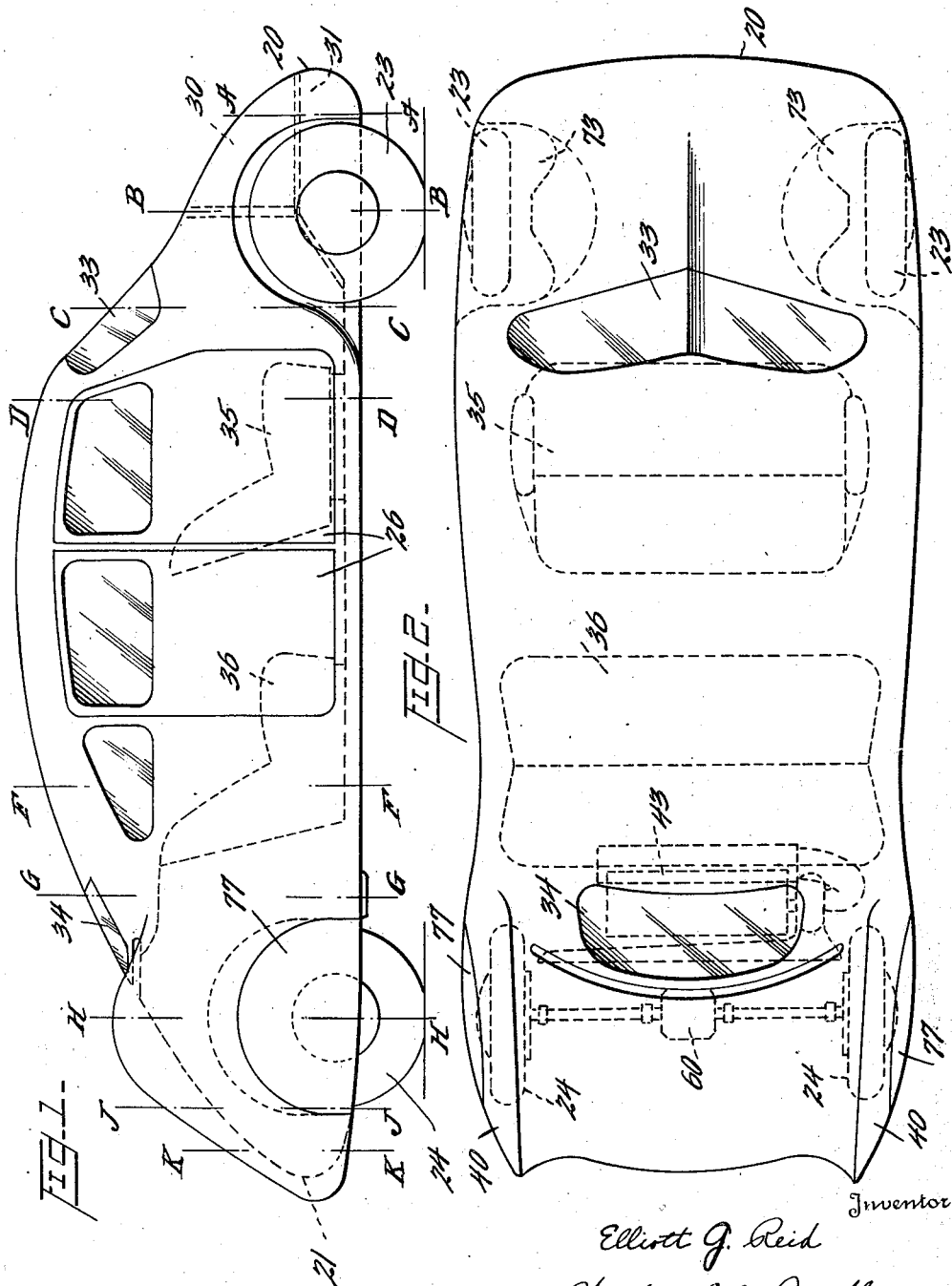
Inventor
Elliott G. Reid
By Watson, Cole, Grindle & Watson
Attorney

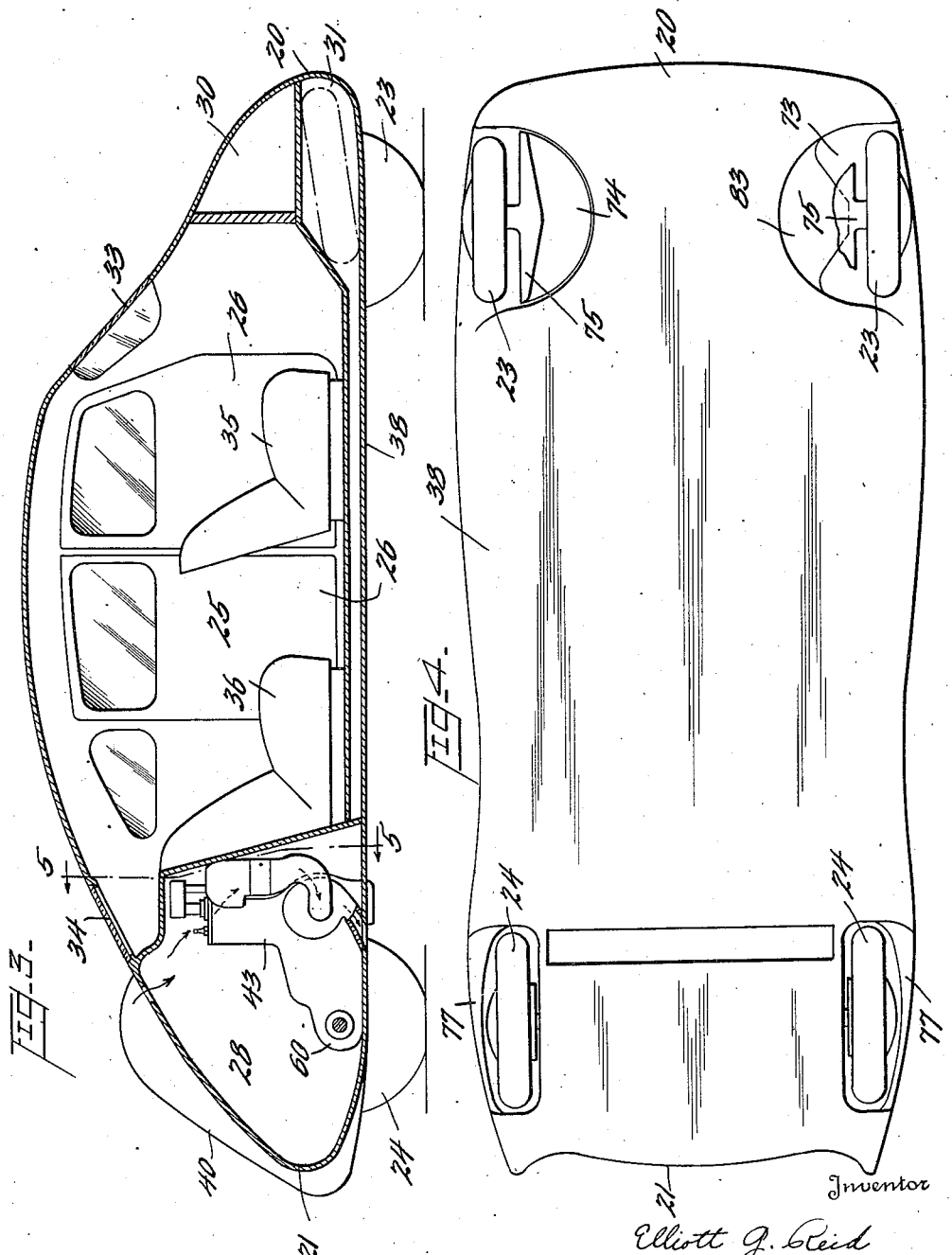

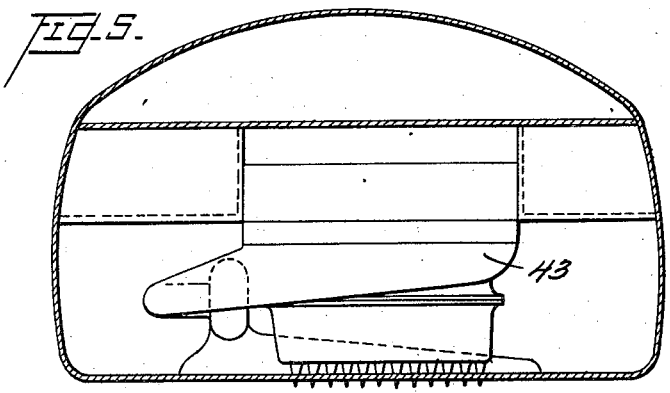
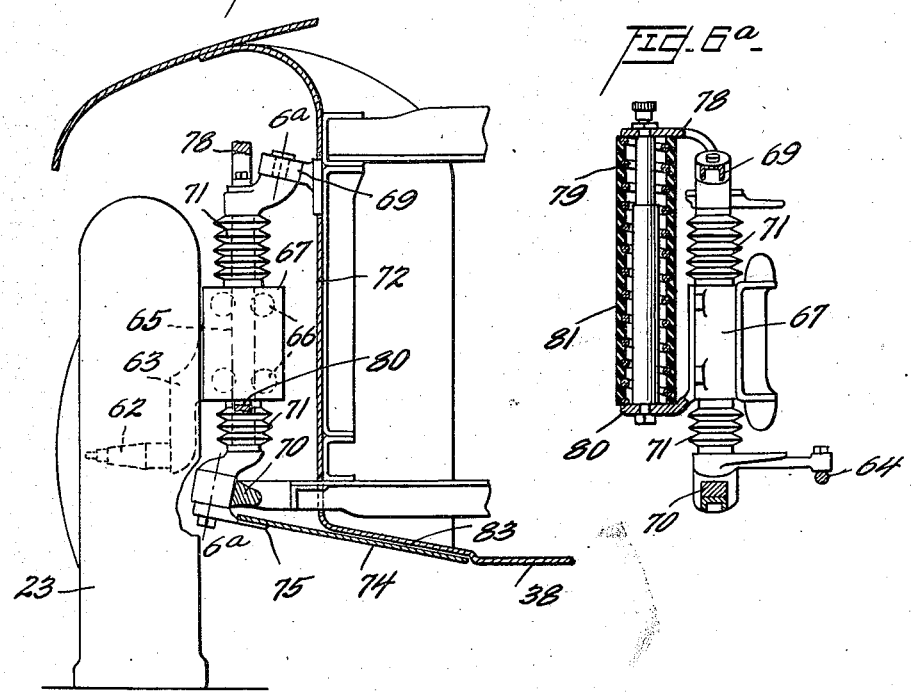

June 2, 1942. E. G. REID 2,284,988
MOTOR VEHICLE
Original Filed Feb. 24, 1937 5 Sheets-Sheet 4
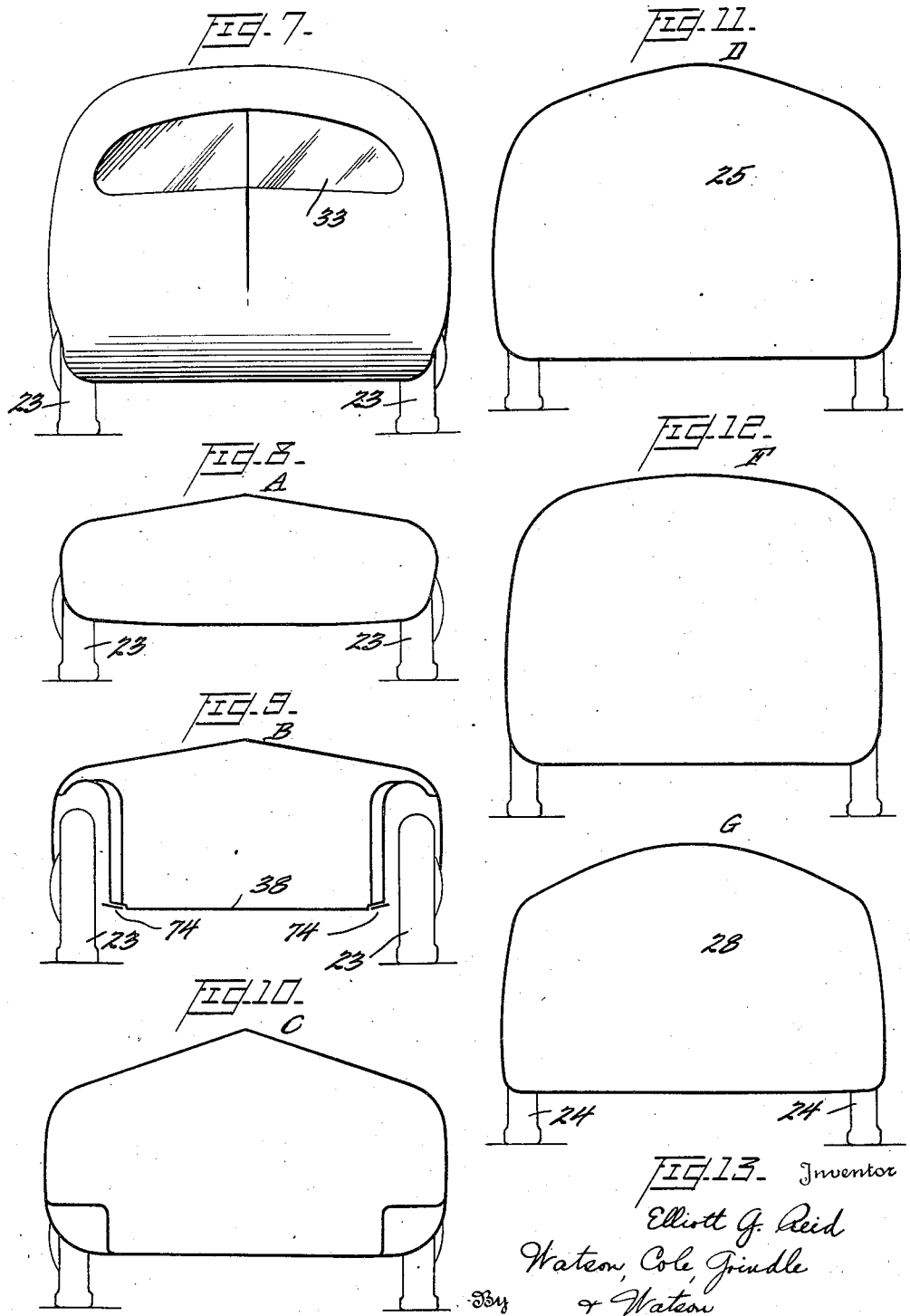
Inventor
Elliott G. Reid
By Watson, Cole, Grindle & Watson
Attorney

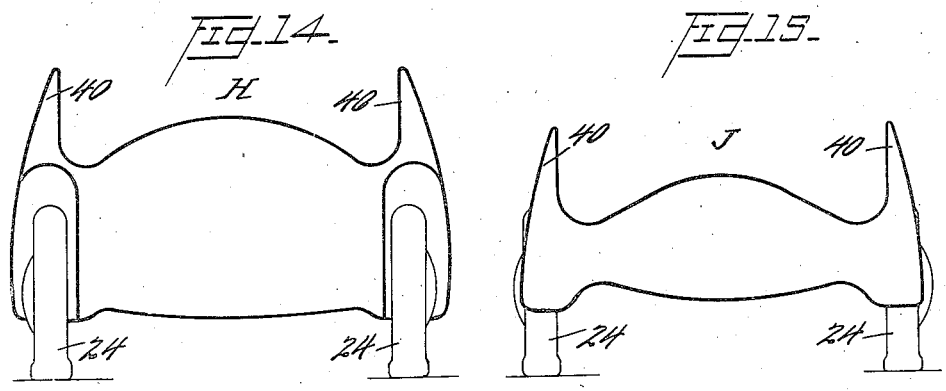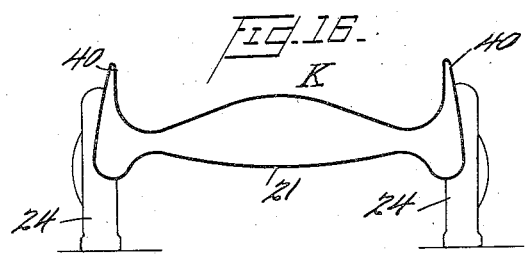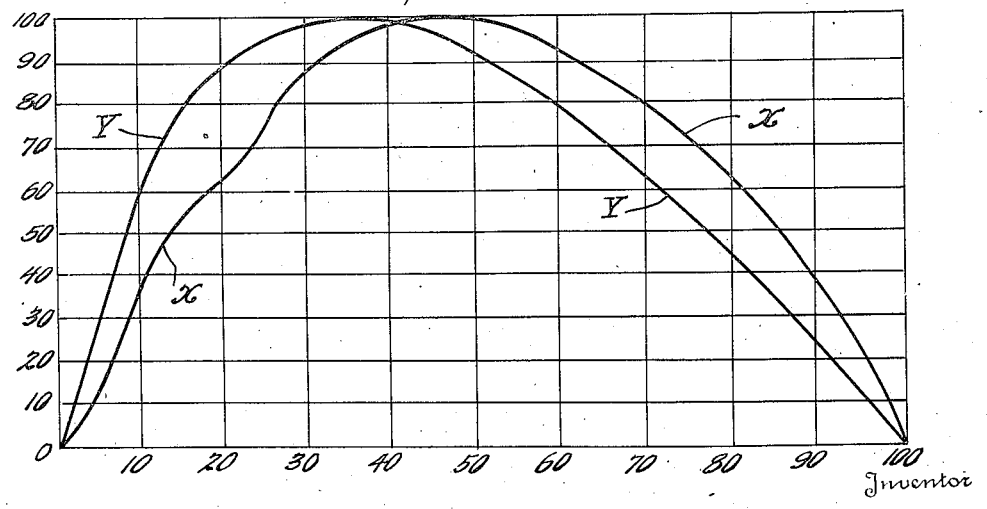

Patented June 2, 1942

2,284,988

UNITED STATES PATENT OFFICE 2,284,988

MOTOR VEHICLE

Elliott G. Reid, Palo Alto, Calif., assignor to Packard Motor Car Company, Detroit, Mich., a corporation of Michigan Original application February 24, 1937, Serial No. 127,540. Divided and this application December 11, 1939, Serial No. 308,737

6 Claims. (Cl. 296—1)

This invention relates to motor vehicles and is more particularly concerned with improvements tending to reduce the wind resistance to movement of vehicle bodies. It is the principal object of the invention to provide a vehicle which is so modified with respect to existing vehicles as to materially improve the aerodynamic characteristics of the body while maintaining or improving upon present standards of overall length, seating capacity, roominess of the body, comfort of the passengers and driver, and the accessibility of the body as regards ingress and egress.

The performance and economy characteristics of any self-propelled vehicle are primarily determined by the conditions of equilibrium between the power required and the power available for propulsion. Up to the present, improvements of automobile performance have been accomplished almost entirely by increasing the power available, and economy has suffered whenever the overall thermal efficiency of the power plant has not been correspondingly improved. For a variety of reasons, little attention has been paid to reducing the power requirements, although this is the only plan of attack which can lead to simultaneous improvements of both economy and performance, regardless of the progress of power plant development.

Although analysis reveals that major reductions of motor car air resistance would be of value at low as well as at high speeds, the potentialities of such aerodynamic refinement have not been realized because it has appeared, until now, that the requirements of low air resistance are incompatible with those of practical utility. The chief obstacle has been the generally accepted principle that the rear portion of a body must taper smoothly and gradually toward a point or edge if low resistance is to be attained. The conflict between this principle and the practical limitation of overall length is obvious when one contemplates the conventional arrangement in which an engine of small cross-sectional area is located forward of a passenger compartment of large transverse dimensions. Although it might seem that the substitution of a rear engine arrangement would permit of considerable reduction of the overall length required for an aerodynamically satisfactory body, practical considerations again intervene in such forms as passenger space limitations, difficulty of arranging for entrance and egress, head-on crash hazard, engine cooling problems, etc.

The present invention may be described as a new type of streamline, rear engine motor car in which a major reduction of air resistance has been effected without exceeding the highly important limitation of over-all length and without sacrificing any of the aforementioned qualities of practical importance. Certain of the principal innovations which have made this possible are described below.

1. *Disposition of principal components.*—The two transverse passenger seats are located forward of the rear wheels and aft of the front wheels; they may extend across the full width of the body. The whole passenger compartment is placed as far forward as is compatible with accessibility to the seats through conventional side-opening doors. The slope of the roof line and the taper of the tail are thus made as small as is possible with a given transverse profile and limited over-all length. The power plant, which may be of in-line or V type, is located between the rear seat and the rear axle; it is preferably mounted transversely and therefore occupies little longitudinal space.

2. *Basic body form.*—In the construction of the body, it is sought to minimize both the component of resistance due to shape (form drag) and that arising from the creation of lift (induced drag). To obtain a small form drag, the variation of cross-sectional area with length is patterned after that of an airship hull of known merit (U. S. N. C-class hull) and the external contours, particularly those of the critical portion aft of the largest transverse section, are made as smooth as possible in order to eliminate possible obstacles to the maintenance of smooth air flow around the body. The suppression of induced drag is accomplished by shaping the body in such a way as to minimize its lift without augmenting the form drag.

The application of these principles to the problem of enclosing the passenger compartment and chassis leads to a body of approximately uniform width which has a relatively flat under surface and a generally convex upper surface: it leaves exposed to the passing air only the lower parts of all four wheels and the outer faces of the two front wheels. The area of the largest transverse section is between 0.07 and 0.16 times the square of the over-all length; this section is located forward of midlength and aft of quarter-length. The details of the forms of the nose and tail which serve to reduce the induced drag will be described later.

3. *Fins.*—In spite of having an airship-like distribution of cross-sectional area, this motor car body differs so markedly from its symmetrical prototype that its air resistance would be unacceptably large were it not for the utilization of certain auxiliary devices and methods for maintaining continuous air flow around it. The twin fins which characterize the design serve several purposes, one of which is to exercise control over the flow of air around the rear portion of the body. One fin is located over each rear wheel; both lie approximately in vertical longitudinal planes and their horizontal profiles are similar to airplane wing sections. These fins influence the character of the airflow in their neighborhood by producing their a different space rate of static pressure variation along the direction of flow—subsequently termed "longitudinal pressure gradient"—than that which would occur in their absence. This action and its significance are explained fully in my prior application, Serial No. 127,540, filed February 24, 1937, which matured into Patent No. 2,206,202, on July 2, 1940, of which this application is a division.

4. *Boundary layer control.*—Although the existence of an adverse pressure gradient is a prerequisite to flow separation, it must be pointed out that separation actually does occur only when certain conditions have been established in the "boundary layer" of the flow. This designation is applied to that layer of fluid which is adjacent to a boundary surface and in which the velocity has been appreciably reduced by the action of skin friction. It has been experimentally demonstrated that separation may be prevented or suppressed by artificial control of the conditions in the boundary layer. One proven method is to remove the retarded fluid by the application of suction to slots in the boundary surface; another is to accelerate the retarded layer by discharging fluid tangentially along the surface. This method and the means for practicing the same are described and claimed in more detail in my copending application, Serial No. 308,736 filed concurrently herewith.

5. *Wheel pocket covers.*—It has been found that the body recesses which must be provided to accommodate the steering displacements of the front wheels cause a large amount of air resistance. The sides of the recesses are masked by the wheels which serve, when in the straight-ahead position, as fairings for the body sides but the recesses are completely open as seen from below the body. The importance of the flow disturbances produced by these cavities was proved by covering them during some model tests. Closures or pocket covers for the bottoms of these recesses are therefore incorporated as a part of this invention.

The essential characteristics of the pocket covers are that they form smooth continuations of the parts of the lower body surface adjacent to them, that they partake of the steering rotation of the wheels and that they cover or mask those parts of the recesses not occupied by the wheels. Although it is desirable that the pocket covers shall not share the vertical motions of the adjacent wheels, this feature is of quantitative rather than of qualitative importance and considerable benefits may be obtained by the use of covers which share the vertical displacements as well as the steering motions of the wheels.

6. *Nose shape.*—Body resistance has been found very sensitive to changes in the form of the nose. In this case, an adverse pressure gradient along the lower surface of the body may cause series flow disturbances in the neighborhood of the front wheels. Control of this gradient is readily obtainable through modifications of form and it has been determined that the use of a depressed nose resulted in less air resistance, even with pocket covers in place, than did one of more nearly symmetrical form.

This body construction is, therefore, characterized by a depressed nose, i. e. the forward portions of the vertical longitudinal sections are asymmetrical and the foremost points of these profiles are relatively close to the forward prolongation of the undersurface contours which are, themselves, substantially horizontal in this region. It should be added that, in addition to its effects upon form drag, the depression of the nose results in a reduction of the lift and, consequently, a reduction of the induced drag.

7. *Tail form—Lower surface.*—Since it is known that the elevation of a flap which constitutes the rear portion of an airplane wing reduces both the lift and resistance of that wing, a similar distortion may be expected to have like effects in the case of the automobile body. This deduction having been verified experimentally, an upward sweep of the rear portion of the lower body surface is one of the features of this invention. Since the possibility of flow separation exists in this region, the rearward discharge of cooling air for purposes of boundary layer control is considered an important adjunct to this feature.

Although the features described above have been devised primarily in effort to minimize air resistance, their use offers several important and heretofore unmentioned advantages over the conventional type and over other so-called streamline cars.

Riding qualities are improved by the location of the passengers close to the center of gravity of the car. Since the majority of the variable load consists of passengers who occupy the rear seat, and since the positions of the rear seat and the center of gravity almost coincide, the variation of riding qualities with load will be very slight.

The location of the power plant behind the passenger compartment eliminates noise, engine fumes and the vibration of the conventional power transmission system. The mechanism for power transmission may be greatly simplified when the engine crankshaft is both close to and parallel to the driven axle. It is also important that the frontal area of the body and the height of the center of gravity of the car may be reduced by the lowering of the passenger compartment which becomes possible when the engine is located in the rear and no transmission mechanism is present beneath the floor.

Further objects and features of the invention will be apparent from the following description taken in connection with the accompanying drawings, in which—

Figure 1 is a side elevation of a motor vehicle constructed in accordance with the principles of the invention;

Figure 2 is a plan view of the vehicle shown in Figure 1;

Figure 3 is a central, vertical, longitudinal section of the vehicle;

Figure 4 is a bottom plan of the vehicle;

Figure 5 is a transverse section taken substantially on the line 5—5 of Figure 3;

Figure 6 is a partial transverse, sectional view showing a form of suspension for one of the steerable road wheels;

Figure 6a is a vertical sectional view taken substantially on the line 6a—6a of Figure 6;

Figures 7 to 16 inclusive are diagrammatic transverse sectional views at points (indicated by letter) spaced substantially equidistant along the length of the vehicle, these views showing approximately the transverse sectional area and the contour of the vehicle; and Figure 17 is a graphical comparison of the variation in cross-sectional area of the vehicle as compared with that of the C class Navy airship hull.

For convenience in describing the invention, reference is made to the vehicle chosen for illustration in the accompanying drawings and specific langauge is employed. It will nevertheless be appreciated that the invention is not limited to this precise construction and arrangement; it will be apparent from the description and appended claims that various modifications of the several features referred to herein are contemplated as a part of the invention and that many of these features may be employed separately rather than in conjunction with the others with highly improved results.

The forward portion or nose of the vehicle is indicated in the drawings at 20, and the rearward portion or tail at 21, the forward steerable road wheels and the rear driving wheels being shown at 23 and 24 respectively. The vehicle body is preferably divided as shown into a number of compartments, including a generally centrally located passenger compartment 25 having conventional entrance and exit doors 26 therein, a rearwardly disposed motor compartment 28, and storage space in the vehicle nose including, for example, a luggage compartment 30 and a compartment 31 for receiving a spare tire, tools, or the like, the compartments in the nose and the engine compartment 28 being accessible through suitably disposed openings which are normally closed by hinged panels or the like. The forward windshield 33 may be in the shape of a flat V in horizontal section, being formed of two flat glass plates which are substantially flush with the adjacent body panel. While the contour of the vehicle may be smoothly curved in horizontal section at this point, curved windshield glass being employed, the difference in effect on the aerodynamic characteristics of the vehicle is negligible. At the rear of the vehicle, however, conditions are more critical and it is therefore preferable to employ a curved rear vision glass 34 conforming to the contur of the body panel at that point, the periphery of the glass being substantially flush with the adjacent panel.

In the sedan type of vehicle which is chosen for illustration, two seats 35 and 36 are provided, these seats being accessible as hereinbefore explained through conventional side doors 26 and preferably extending the full width of the passenger compartment 25. It will be appreciated that these seats are located generally centrally of the vehicle so as to afford maximum head room and seat width and to promite riding comfort, the occupants of either seat being located intermediate the axles or equivalent road wheel suspension means. Preferably the seats are arranged entirely forward of the rear wheels and entirely aft of the forward wheels. Owing to the fact that the forward seat 35 is located a substantial distance in the rear of the extreme front end of the vehicle and rearwardly of the front road wheel pockets, this seat can be as wide as the rear seat 36, and the occupants of the forward seat experience, a feeling of security not afforded in vehicles in which the driver is seated at the extreme forward end of the body. It is found that with this arrangement of passenger compartment, the accommodations are in every way comparable or superior to those found in more conventional vehicles which are well designed as regards comfort but which lack the low air resistance characteristics afforded by the vehicle described herein.

The bottom of the vehicle is substantially completely enclosed by a lower panel 38 which affords a generally flat lower surface, this panel being inclined upwardly toward the rear in a smooth curve from a point somewhat forward of the rear axle, whereby the lift of the whole body is materially reduced with corresponding reduction of the induced drag. Both the induced drag and the form drag are materially reduced by depression of the vehicle nose as hereinabove explained.

In order that the over-all length of the vehicle will not materially exceed standard practice, the upper surface of the tail 21 is preferably sloped downward at a fairly steep angle, sufficiently steep to result in separation of continuous flow from the surface at a point well forward of the extreme rear of the tail in the absence of special precautions for reasons hereinbefore more fully set forth. To avoid this very serious impairment of the aerodynamic efficiency of the vehicle, fins 40 are provided at each side of the body, these fins forming continuations of and merging into the adjacent portions of the body. From the plan view of these fins afforded by Figure 2 and from the contours shown in Figures 14 to 16, it will be seen that they are generally of airfoil profile, although a wide variation of fin shape and arrangement is permissible. In general, the fins will function satisfactorily if they are so formed and positioned that the transverse components of the resultant air forces act thereon in an outward direction, i. e., away from the central, vertical longitudinal plane of the vehicle, as explained more fully in my prior application, above identified.

It will be observed that the engine 43 extends transversely of the vehicle and is preferably the type in which the cylinders are arranged in line so as to occupy a minimum of space in the direction of the length of the vehicle to permit the rear of the body to be brought down severely, although a V-type engine may be used. The rear road wheels 24 are driven in any suitable manner from the engine 43 through gearing disposed within a housing 60, which gearing will preferably include the usual change speed transmission gearing and the conventional differential gearing, and the road wheels 24 may be supported for rising and falling movement in any desired manner.

One method of effectively closing the pockets for the front steerable wheels 23 is shown in detail in Figures 4 and 6 of the drawings. The wheel suspension selected for illustration is one disclosed more particularly in the prior application for U. S. Letters Patent of Frank C. Best, Serial No. 91,229, filed July 17, 1936, to which reference may be had for a more detailed disclosure. For the purpose of describing the present invention the essential elements of this suspension as shown in Figures 6 and 6a will suffice. Thus the road wheel 23 is supported on the conventional wheel spindle 62 which projects laterally from a wheel carrying member 63, the latter being supported on a generally vertical spindle 65 for bodily displacement lengthwise thereof and for rotation therewith, rollers 66 mounted in a casing 67 which forms a part of the wheel carrier 63 being received in coacting guide grooves formed in the spindle 65 and extending longitudinally thereof, this construction affording the equivalent of a simple sliding and nonrotative connection between the carrier 63 and the spindle 65.

The spindle 65 is supported in brackets 69 and 70 secured to the vehicle frame, in which brackets the spindle is journalled for rotation about a generally upstanding axis, the axis corresponding to the more conventional steering knuckle axis and being preferably inclined with respect to the vertical to afford the usual wheel caster effect and to improve resistance to braking effort. Rotation of the spindle 65, the wheel carrier 63, and the road wheel 23 about this upstanding axis is effected by any conventional steering linkage connected with the steering arm 64 for the purpose of imparting steering movement to the road wheel in a generally horizontal plane. Flexible dust shields 71 surround the spindle 65 and are secured at their ends to the spindle and to the casing 67 for the purpose of excluding dust from the relatively moving parts. An arm 78 secured to the upper end of the spindle 65 serves as an abutment for a coil spring 79, the spring engaging at its lower end with an arm 80 secured to the casing 67. Preferably the spring is embedded in a sheath 81 of rubber or other imperfectly elastic, deformable material, this material serving to support and house the spring, to increase the resistance to flexure of the latter, and to damp vibrations and prevent surging of the spring.

It will be observed that with this construction the road wheel rises and falls in a substantially vertical path during movement of the vehicle over an irregular road bed. The wheel suspension is relatively light and compact and lends itself well to use in a vehicle of the type described herein. It will nevertheless be appreciated that other forms of wheel suspension in which the road wheels partake of movements of a slightly different nature in rising and falling may be employed in lieu of the suspension illustrated herein, the present invention residing only in the association with the wheel suspension of means for closing the wheel pockets.

The wheel pockets for the wheels 23 may be formed by cutting away the side panels and the bottom panel of the vehicle body to an extent sufficient to permit requisite movement of the wheels, the opening in the lower body panel 38, designated at 73, being preferably of the shape shown more particularly in Figure 2 so as to adequately accommodate the peripheral portions of the road wheels during steering but extending outwardly adjacent the wheel spindles to afford more room within the interior of the vehicle. A panel 72 extending between the side and bottom panels and so shaped as to afford maximum space within the vehicle body without interference with wheel movement may complete the enclosure of each pocket. A generally semi-circular closure plate 74 is supported on a bracket 75, the latter being secured to the lower end of the upstanding spindle 65 so as to rotate therewith as the road wheel is steered. The closure plate is illustrated as disposed in a plane substantially perpendicular to the king pin axis, so that the edge of the plate will not rise and fall below the adjacent edge of the lower panel of the body as the wheel is steered. If desired the lower panel may be provided with an offset flat portion 83 as shown more particularly in Figure 6 to afford closer cooperation with the closure plate and further retard flow of air therebetween. Thus each opening 73, or such portion thereof as lies inwardly of the associated road wheel 23 remains closed regardless of steering or rising and falling movement of the road wheel, and in effect the lower panel 38 is practically continuous between the oppositely disposed road wheels. The result is more effectively achieved by reason of the fact that the plate 74 does not rise and fall with its associated road wheel. It will be appreciated, however, that in some instances it may be desirable to so support the plate 74 as to cause the latter to partake of such rising and falling movement, but the slight displacement of the plate under normal conditions and on smooth roads will not materially adversely affect the smooth flow of air beneath the vehicle. If desired, the closure plate 74 may be provided with one or more louvres for the purpose of cooling the road wheel brakes, but it is preferable to rely for cooling either on such flow of air as may occur between the closure plates and the lower body panel 38 or to provide some other method of cooling which will avoid any interruption of air flow at this critical point.

If the closure plate 74 is disposed as shown in Figure 6 in a plane perpendicular to the axis of the wheel spindle, it is of course advisable to so form the portions of the lower panel immediately forward and rearward of this closure plate so as to avoid any sharp break in the contour thereof. This is in general preferable to disposing the closure plate in a substantially horizontal plane since the plate will occupy this plane only when the wheels are in the straight-ahead position, but the latter arrangement is also contemplated as a part of the instant invention.

Preferably cover plates for the front wheel side pocket openings are omitted, the wheels being so disposed that they act as reasonably efficient fairings to prevent materially adverse effect on the air stream. The rear wheels are shown, however, as provided with side cover plates 77 which are secured in position in any convenient manner for ready removal to permit access to the wheels. These plates are so shaped as to form continuations of the adjacent portions of the side and bottom body panels.

Headlamps may be disposed within the vehicle nose if desired, so as to avoid any disturbance of the body contour. It has been found, however, that no serious adverse effect on the aerodynamic efficiency of the body results from the use of protruding headlamps, although these should preferably be formed so as to merge with the surface of the body nose, for example in the manner employed in some vehicles in mounting the headlamps on the fenders.

The general contour of the vehicle has been hereinbefore described as being such as to compare favorably with accepted practice in the field of airship construction and the results achieved are apparent from an inspection of Figure 17 in which the variation in cross-sectional area of the vehicle is compared with that of the C class Navy airship hull. In this figure the ordinates represent the percentage of maximum cross-sectional area and the abscissae represent percentage of length, curve X being that of a vehicle body such as is illustrated herein and curve Y being that of the C class airship hull. It will be appreciated that these curves are almost identical, the curve X being smooth, continuous, and without abrupt changes of slope; it is particularly significant that there are no points of inflection in the portion of this curve which lies to the right of the maximum ordinate, i. e. the section corresponding to the part of the body which is aft of the largest transverse section. The maximum cross-sectional area occurs at about 45% of the length measured from the forward end.

By the employment in a vehicle of the more important features disclosed in this and related applications, it has been found possible to reduce the air resistance to less than one-third of that of the conventional modern car without violating present standards of over-all length, ground clearance, overhang beyond the road wheels, maximum width, convenient and comfortable seating, accessibility, and directional stability in cross winds. One of the most important factors in this accomplishment is the reduction of induced drag brought about by the suppression of lift. The depressed nose, the up-swept rear lower surface and the twin fins which experience outwardly directed air forces all contribute materially toward this end. It is believed that the present invention constitutes the first example of intentional application to motor car construction of the aerodynamic principle of drag reduction through lift suppression.

Having thus described the invention, what is claimed as new and desired to be secured by Letters Patent is:

1. In a motor vehicle, the combination with a vehicle body having an external form conducive to the maintenance of a smooth flow of air thereover and including a generally flat and uninterrupted lower surface, of steerable road wheels partially housed within said body, said lower surface being formed with openings through which said road wheels extend, said openings being formed to permit of horizontal swinging movement of said wheels in steering, and closure members for said openings supported for swinging movement with said wheels.

2. In a motor vehicle, the combination with a vehicle body having a generally flat lower panel extending beneath the major portion of the body, of vehicle suspension means including road wheels, one pair of road wheels being steerable, said lower panel having openings therein through which the lower portions of said road wheels depend, and means partaking of steering movement with said steerable road wheels for closing the unoccupied portions of the associated openings.

3. In a motor vehicle, the combination with a vehicle body having an external form conducive to the maintenance of a smooth flow of air thereover and including a generally flat and uninterrupted lower surface, of steerable road wheels partially housed within said body, said lower surface being formed with openings through which said road wheels extend, said openings being formed to permit of horizontal swinging movement of said wheels in steering, and closure members for said openings supported for swinging movement with said wheels, said closure members extending inwardly from said wheels and affording lower surfaces substantially coplanar with the lower surface of said body.

4. In a motor vehicle, the combination with a vehicle body having an external form conducive to the maintenance of a smooth flow of air thereover and including a generally flat and uninterrupted lower surface, of steerable road wheels partially housed within said body, said lower surface being formed with openings through which said road wheels extend, said openings being formed to permit of horizontal swinging movement of said wheels in steering, and closure members for said openings supported for swinging movement with said wheels, said body including generally flat lateral surfaces having portions removed adjacent said wheels to permit steering movement of the latter, said wheels having the outer faces thereof positioned substantially flush with said lateral body surfaces to act as fairings.

5. A motor vehicle body having external surfaces of such form as to promote smooth flow of air thereover, said body being of generally uniform width throughout its height and having a rearwardly tapered tail and a generally flat lower surface which slopes upwardly toward the rear from a point spaced substantially from the rear end of the body, whereby the tail is elevated to the maximum extent compatible with adequate enclosure of the vehicle chassis, said body having a depressed and rounded nose, and means including longitudinally directed generally upstanding fins disposed at either side of the upper surface of said tail and so formed and positioned as to suppress flow separation from the latter.

6. A motor vehicle body having external surfaces of such form as to promote smooth flow of air thereover, the cross-sectional area varying gradually and without abrupt change over the entire length of the body and attaining a maximum value at a point forward of mid-length and rearward of quarter-length, said maximum value being between 0.07 and 0.16 times the square of the length.

ELLIOTT G. REID.